US 7,917,091 B2

(12) United States Patent
Montemayor et al.

(10) Patent No.: US 7,917,091 B2
(45) Date of Patent: Mar. 29, 2011

(54) METHOD AND APPARATUS FOR CALIBRATING THE SIDEBAND REJECTION OF A RECEIVER

(75) Inventors: Raymond Montemayor, Encinitas, CA (US); Sheng Ye, Carlsbad, CA (US)

(73) Assignee: MaxLinear, Inc., Carlsbad, CA (US)

( * ) Notice: Subject to any disclaimer, the term of this patent is extended or adjusted under 35 U.S.C. 154(b) by 724 days.

(21) Appl. No.: 11/770,596

(22) Filed: Jun. 28, 2007

(65) Prior Publication Data

US 2008/0057899 A1    Mar. 6, 2008

Related U.S. Application Data

(60) Provisional application No. 60/806,086, filed on Jun. 28, 2006.

(51) Int. Cl.
*H04B 1/00*    (2006.01)
(52) U.S. Cl. ............... 455/63.1; 455/67.11; 455/278.1; 455/296; 375/345; 375/346
(58) Field of Classification Search .............. 455/424, 455/425, 456.5, 456.6, 561, 550.1, 575.1, 455/63.1, 67.11, 67.14, 114.2, 115.1, 226.1, 455/232.1, 247.1, 296, 139; 375/345, 346, 375/362, 254, 235, 230–234, 324, 349, 343, 375/316, 371, 344; 370/525, 526, 516, 519, 370/206, 342; 342/154, 380, 367, 361, 364, 342/366, 371
See application file for complete search history.

(56) References Cited

U.S. PATENT DOCUMENTS

| | | | | |
|---|---|---|---|---|
| 4,122,448 A * | 10/1978 | Martin | ........................ | 342/174 |
| 4,953,182 A * | 8/1990 | Chung | ........................ | 375/344 |
| 5,828,955 A * | 10/1998 | Lipowski et al. | ............ | 455/324 |
| 6,044,112 A * | 3/2000 | Koslov | ........................ | 375/235 |
| 6,330,290 B1 * | 12/2001 | Glas | ............................ | 375/324 |
| 6,459,693 B1 * | 10/2002 | Park et al. | .................... | 370/342 |
| 6,558,543 B1 * | 5/2003 | Sandberg et al. | ............ | 210/266 |
| 6,744,829 B1 * | 6/2004 | Mohindra | .................... | 375/343 |
| 6,760,577 B2 * | 7/2004 | Li | ................................ | 455/323 |
| 7,003,262 B2 * | 2/2006 | Fukui | ............................ | 455/47 |

(Continued)

FOREIGN PATENT DOCUMENTS

WO    WO 2008/003061 A2    1/2008

OTHER PUBLICATIONS

International Search Report of Feb. 18, 2008 for international application No. PCT/US2007/072399.

(Continued)

*Primary Examiner* — Duc Nguyen
*Assistant Examiner* — Charles Chow
(74) *Attorney, Agent, or Firm* — Ardeshir Tabibi; Kilpatrick Townsend & Stockton LLP

(57) ABSTRACT

Methods and apparatus for calibrating In-phase and Quadrature imbalance within a receiver are described. A calibration process can inject a calibration tone to an RF or IF portion of a receiver. The receiver can frequency translate the tone to distinct I and Q calibration signals. The receiver upconverts the I and Q calibration signals to complementary sidebands or images using distinct and substantially matched upconverters. The complementary sidebands are mixed together to generate an error signal. The receiver determines a phase and amplitude correction based on the error signal.

21 Claims, 5 Drawing Sheets

U.S. PATENT DOCUMENTS

| | | | |
|---|---|---|---|
| 7,020,220 B2* | 3/2006 | Hansen | 375/324 |
| 7,181,205 B1* | 2/2007 | Scott et al. | 455/423 |
| 7,585,010 B2* | 9/2009 | Hardy et al. | 296/37.16 |
| 7,620,373 B2* | 11/2009 | Cole et al. | 455/73 |
| 7,627,060 B2* | 12/2009 | Taylor | 375/324 |
| 7,627,295 B2* | 12/2009 | Takahiko et al. | 455/139 |
| 2002/0177425 A1 | 11/2002 | Li | |
| 2003/0174641 A1* | 9/2003 | Rahman | 370/206 |
| 2003/0206603 A1 | 11/2003 | Husted | |
| 2004/0184562 A1* | 9/2004 | Wang et al. | 375/322 |
| 2005/0047536 A1* | 3/2005 | Wu et al. | 375/346 |
| 2005/0148304 A1 | 7/2005 | Jerng | |
| 2005/0260949 A1* | 11/2005 | Kiss et al. | 455/67.14 |
| 2006/0068739 A1* | 3/2006 | Maeda et al. | 455/295 |

OTHER PUBLICATIONS

Written Opinion of Feb. 18, 2008 for international application No. PCT/US2007/072399.

* cited by examiner

US 7,917,091 B2

METHOD AND APPARATUS FOR CALIBRATING THE SIDEBAND REJECTION OF A RECEIVER

CROSS-REFERENCES TO RELATED APPLICATIONS

This application claims the benefit of U.S. Provisional Application No. 60/806,086, filed Jun. 28, 2006, entitled METHOD AND APPARATUS FOR CALIBRATING THE SIDEBAND REJECTION OF A RECEIVER, which is hereby incorporated herein by reference in its entirety.

BACKGROUND

I. Field of the Disclosure

The invention relates to electronic communications. More particularly, the invention relates to methods and apparatus for calibrating a receiver to improve performance.

II. Description of Related Art

Radio Frequency (RF) receivers often process received signals in quadrature signal paths. The receiver can receive an RF signal and recover or otherwise generate In-phase (I) and Quadrature (Q) signal components. Often, the receiver will generate the I and Q signal components in conjunction with frequency translation.

An imbalance in the processing of the I and Q signal components results in a sideband when the I and Q signals are combined. The level of the sideband can be reduced by matching or otherwise calibrating the signal processing in the I and Q signal paths. However, matching the phase and gains of the I and Q signal paths is complicated when the receiver is configured to support a wide range if input frequencies. It is difficult to match the gains in the I and Q signal paths across a wide range of frequencies. Similarly, it is difficult to match the phase responses of the I and Q signal paths.

The differences in the gain and phase responses of the I and Q signal paths may be attributable to variations in the frequency conversion stages used to generate the I and Q signal components. Therefore, not only do the I and Q signal paths need to be closely matched, but they may need to compensate for differences in the I and Q signal components produced by a frequency conversion stage.

It is desirable to maintain the gain and phase response of the I and Q signal processing paths in order to reduce or otherwise minimize the sideband that results from an amplitude or phase imbalance. Further, it is desirable to reduce the contribution from a sideband over a wide frequency range supported by a receiver.

The literature for related fields includes the following:
[1] R. Montemayor and B. Razavi, "A Self-Calibrating 900-MHz CMOS Image-Reject Receiver," *Proc. Eur. Solid-State Circuits Conf.*, September 2000., pp. 292-295.
[2] L. Der and B. Razavi, "A 2-GHz CMOS Image-Reject Receiver With LMS Calibration," *IEEE J. Solid-State Circuits*, Vol. 38, No. 2, February 2003, pp. 167-175.
[3] M. Elmala and S. Embabi, "Calibration of Phase and Gain Mismatches in Weaver Image-Reject Receiver," *IEEE J. Solid-State Circuits*, Vol. 39, No. 2, February 2004, pp. 283-289.

BRIEF SUMMARY

Methods and apparatus for calibrating In-phase and Quadrature imbalance within a receiver are described. A calibration process can inject a calibration tone to an RF or IF portion of a receiver. The receiver can frequency translate the tone to distinct I and Q calibration signals. The receiver upconverts the I and Q calibration signals to complementary sidebands or images using distinct and substantially matched upconverters. The complementary sidebands are mixed together to generate an error signal. The receiver determines a phase and amplitude correction based on the error signal.

Aspects of the invention include a method of calibrating a receiver. The method includes coupling a tone to a receive signal path, frequency converting the tone to in-phase (I) and quadrature (Q) signals, frequency converting the I and Q signals to an intermediate frequency (IF) signal having a sideband attributable to an I/Q imbalance, frequency converting the I and Q signals to an auxiliary IF signal having a sideband that is complementary to the sideband of the IF signal, mixing the IF signal with the auxiliary IF signal to produce a baseband signal, and adjusting at least one of an amplitude or a phase of at least one of the I and Q signals based on the baseband signal.

Aspects of the invention include a method of calibrating a receiver. The method includes determining a calibration event based on a channel selection from one of a plurality of channels in a received wide band signal, deselecting the received wideband signal from a receive signal path, coupling a tone to the receive signal path, frequency converting the tone to a baseband in-phase (I) signal and a baseband quadrature (Q) signal, frequency converting the I signal and the Q signal using an intermediate frequency (IF) local oscillator (LO) signal to an IF signal having a sideband attributable to an I/Q imbalance, frequency converting the I and Q signals using the IF LO signal to an auxiliary IF signal, wherein a phase of the auxiliary IF signal relative to the IF signal is controlled to one of a plurality of predetermined phases, mixing the IF signal with the auxiliary IF signal to produce a baseband signal, and adjusting for at least one of a phase or amplitude imbalance in the I signal and the Q signal based on the baseband signal.

Aspects of the invention include an apparatus for calibrating a receiver. The apparatus includes a tone generator, a multiplexer having a first input coupled to a receive signal path and a second input coupled to the tone generator, and controlled to select one of the receive signal path or the tone generator, an in-phase (I)/quadrature (Q) downconverter coupled to the multiplexer and configured to downconvert a signal output from the multiplexer to an I signal and a Q signal, a balance module coupled to the I/Q downconverter and configured to adjust a phase of the I signal relative to the Q signal based on a phase control signal, an intermediate frequency (IF) local oscillator (LO), an upconverter coupled to the balance module and the IF LO and configured to upconvert the I signal and the Q signal to an IF signal, an auxiliary upconverter coupled to the balance module and the IF LO and configured to upconvert the I signal and the Q signal to an auxiliary IF signal having a phase relative to the phase of the IF signal selected from a plurality of predetermined phases, and an I/Q calibration module configured to mix the IF signal with the auxiliary IF signal to generate a baseband signal, and further configured to determine a value of the phase control signal based at least in part on the baseband signal.

Aspects of the invention include an apparatus for calibrating a receiver. The apparatus includes means for generating a tone, means for selecting one of an output from the means for generating the tone or a signal, means for converting an output signal from the means for selecting to an in-phase (I) signal and a quadrature (Q) signal, means for adjusting an amplitude and a phase of the I signal and the Q signal, means for upconverting the I signal and the Q signal to an intermediate frequency (IF) signal, means for upconverting the I signal and the Q signal to an auxiliary IF signal having a sideband that is complementary to a sideband of the IF signal, means for mixing the IF signal with the auxiliary IF signal to produce a baseband signal, and means for determining a control signal based on the baseband signal, wherein the control signal is coupled to the means for adjusting and controls the means for adjusting.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DESCRIPTION OF EMBODIMENTS OF THE INVENTION

The methods and apparatus described herein allow a receiver to achieve very high levels of sideband rejection by calibrating out the phase and amplitude mismatches between the I and Q (in-phase and quadrature) channels or signal paths of the receiver. This calibration can be implemented easily on an integrated circuit and is automatic, substantially eliminating or reducing the need for manual tuning, trimming, or similar external adjusting performed during the manufacturing process.

The calibration methods and apparatus allow a receiver to achieve sideband rejection of about 60 dBc, and sideband rejection can be greater than about 40 dBc, 45 dBc, 50 dBc, 55 dBc, 60 dBc, or more. These levels of sideband rejection are similar to current state-of-the-art levels reported in literature. Additionally, the methods and apparatus described herein perform well for an extremely wideband system while being sufficiently robust for production of commercial devices. A wideband system can support a frequency range in excess of one or more octaves or one or more decades. The ability of the calibration methods and apparatus described herein make them suitable for consumer applications such as TV tuners, which have a very wide input frequency range spanning over one decade.

The methods and apparatus described herein allow high-performance direct conversion and low-IF receivers to be implemented on an integrated circuit without need for external trimming, tuning, or adjustment mechanisms. This is useful in a variety of applications and communications systems. For example, the methods and apparatus can be implemented in systems such as analog or digital television receivers, where signal to noise and interference requirements are stringent.

In an example of an analog system, the required Signal to Noise Ratio (SNR) for high video quality may exceed 50 dB. For direct-conversion analog receivers this means that the sideband rejection should exceed 50 dB. The methods and apparatus described herein can be implemented within a receiver to achieve such a demanding level of performance without the need for external trimming or adjustment or having relatively minor external trimming or adjustments.

Figure 1:
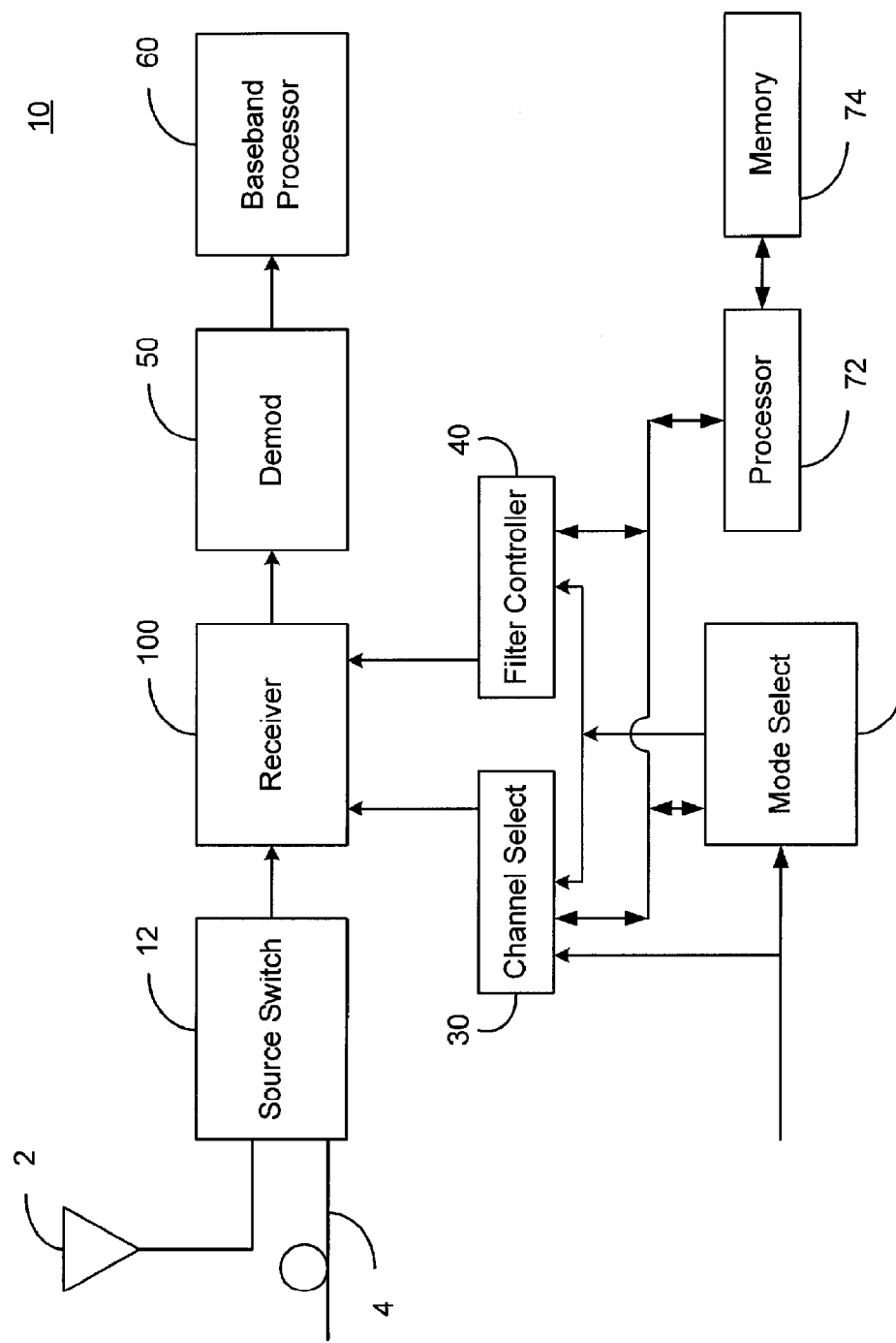
FIG. 1 is a simplified functional block diagram of an embodiment of a receiver in a system.

FIG. 1 is a simplified functional block diagram of an embodiment of a receiver 100 implementing image rejection signal processing in a system 10. The following description describes an embodiment in which the system 10 is configured to operate as a television receiver. However, the system 10 can be any of a plurality of systems. For example, the system 10 can be a television, television receiver, set top box, or television tuner integrated within a video recorder or some other television receiver. In other embodiments, the system 10 can be a radio receiver, wireless transceiver, telephone receiver, cellular telephone, cordless telephone, or some other communication device.

The system 10 can include a source switch 12 that can be coupled to one or more signal sources. For example, a first source input can be coupled to an antenna 2 and a second source input can be coupled to a wired source, such as a cable coupled to a cable television distributor. The source switch 12 is not limited to coupling only one type of signal to the receiver 100. For example, the source switch 12 can be coupled to a television signal source, for example, via the antenna 2, and can be coupled to a radio source, for example, via the cable 4.

The source switch 12 can be configured to couple any one of the signals from any signal source to the input of the receiver 100. The receiver 100 can be, for example, configured to selectively process television signals received from a signal source, such as analog television signals formatted according to an analog television standard, such as NTSC, PAL, SECAM, or some other analog television standard. The receiver 100 can also be configured to process digital television signals, such as digital DVB-T television signals, received from one of the signal sources.

The receiver 100 can receive the RF signal from the source switch 12 and can downconvert the signal to an output IF. The output IF from the receiver 100 can be coupled to a demodulator 50 and from the demodulator 50 to a baseband processor 60. In one embodiment, the demodulator 50 can be configured to demodulate a television signal at a predetermined IF. The demodulated television signals are communicated to a baseband processor 60 that can be configured, for example, to format the signals into video and audio signals for corresponding video and audio output devices (not shown).

The system 10 can also include a mode selection module 20 that can be configured to receive a mode selection input from an external source (not shown) that can be, for example, a user selection or user control. The mode can correspond to an operating mode of the receiver 100, and can be used to determine a particular operating band, channel spacing, channel bandwidths, and output IF frequency.

The mode select module 20 can be coupled to a channel select module 30. The channel select module 30 can be coupled to the mode select module 20 and can be configured to generate the desired local oscillator (LO) control signals. The channel select module 30 can generate the control signals needed to tune the LO frequencies of the receiver 100 to enable reception of the desired RF signal and generation of the desired output IF. The channel select module 30 can also receive one or more input signals from an external source (not shown), such as a user interface or some other module or device that can indicate a desired channel selection.

The channel select module 30 can independently control the RF and IF LOs within the receiver 100. For example, the channel select module 30 can tune the RF LO to a frequency that is based on both a mode and a desired channel. The channel select module 30 can also be configured to control the frequency of the IF LO and may be configured to control the IF LO based only on the desired mode. In other embodiments, the channel select module 30 can be configured to tune both the RF and LO frequencies for each channel.

The channel select module 30 can also be configured to control calibration of the receiver 100. The calibration can include DC offset calibration and In-phase (I) and Quadrature (Q) signal balancing. For example, the channel select module 30 can control an RF switch within the receiver 100 and can initiate the DC offset calibration. In another embodiment, a calibration module within the receiver 100 can receive the channel select signals and the filter control signals and can initiate DC offset calibration and phase imbalance calibration, including controlling the RF switch and filter bandwidths during the duration of the one or more calibration processes.

A filter controller 40 can also be coupled to the mode select module 20. The filter controller 40 can be configured to provide the control signals to the receiver 100 that control one or more filter bandwidths within the receiver 100. The filter controller 40 can be configured to set the filter bandwidths based on the channel selectivity required in the receiver 100, which can depend on the operating mode.

The filter controller 40 can also be in communication with the channel select module 30. The filter controller 40 can be configured to control the filters within the receiver 100 to predetermined bandwidths for a predetermined calibration duration following each channel change. For example, the filter controller 40 can be configured to tune the filters to a minimal bandwidth during DC offset calibration or sideband rejection calibration. Alternatively, a calibration module within the receiver 100 can be configured to control the filter bandwidths during the calibration duration.

A processor 72 and associated memory 74 can be included within the system 10 and can be configured to perform one or more functions within each of the modules. For example, the memory 74 can include one or more processor 72 usable instructions in the form of software that can, when executed by the processor 72, perform some or all of the functions of the various modules within the system 10.

A receiver implementing signal processing in distinct I and Q signal paths may have some imbalance in the gains in the I and Q signal paths. Additionally, the I and Q signal paths may exhibit a phase imbalance, such that the signals are not truly in quadrature. The amplitude and phase imbalance contributes to a sideband signal, which may alternatively be referred to as an image signal. Under ideal amplitude and phase balance, there is no sideband or image. The level of the sideband relative to the desired signal is largely dependent upon the balance between the processing in the I and Q signal paths.

The methods and apparatus described herein calibrate or otherwise correct for amplitude imbalances, phase imbalances, or a combination thereof that may be present within a receiver. The imbalances may be attributable to device variations that can be due to process controls, manufacturing tolerances, part matching, path length matching, and the like or some other contributor to imbalances. Some type of sideband rejection is typically implemented in a direct-conversion or low-IF system. However, the methods and apparatus described herein may be implemented automatically, and may support operations over a broad frequency range. Although the receiver embodiments described herein are direct-conversion receivers, the I/Q balance calibration and correction apparatus and methods described herein are applicable to direct conversion receivers as well as receivers having multiple frequency conversion stages, such as a super heterodyne receiver.

Figure 2:
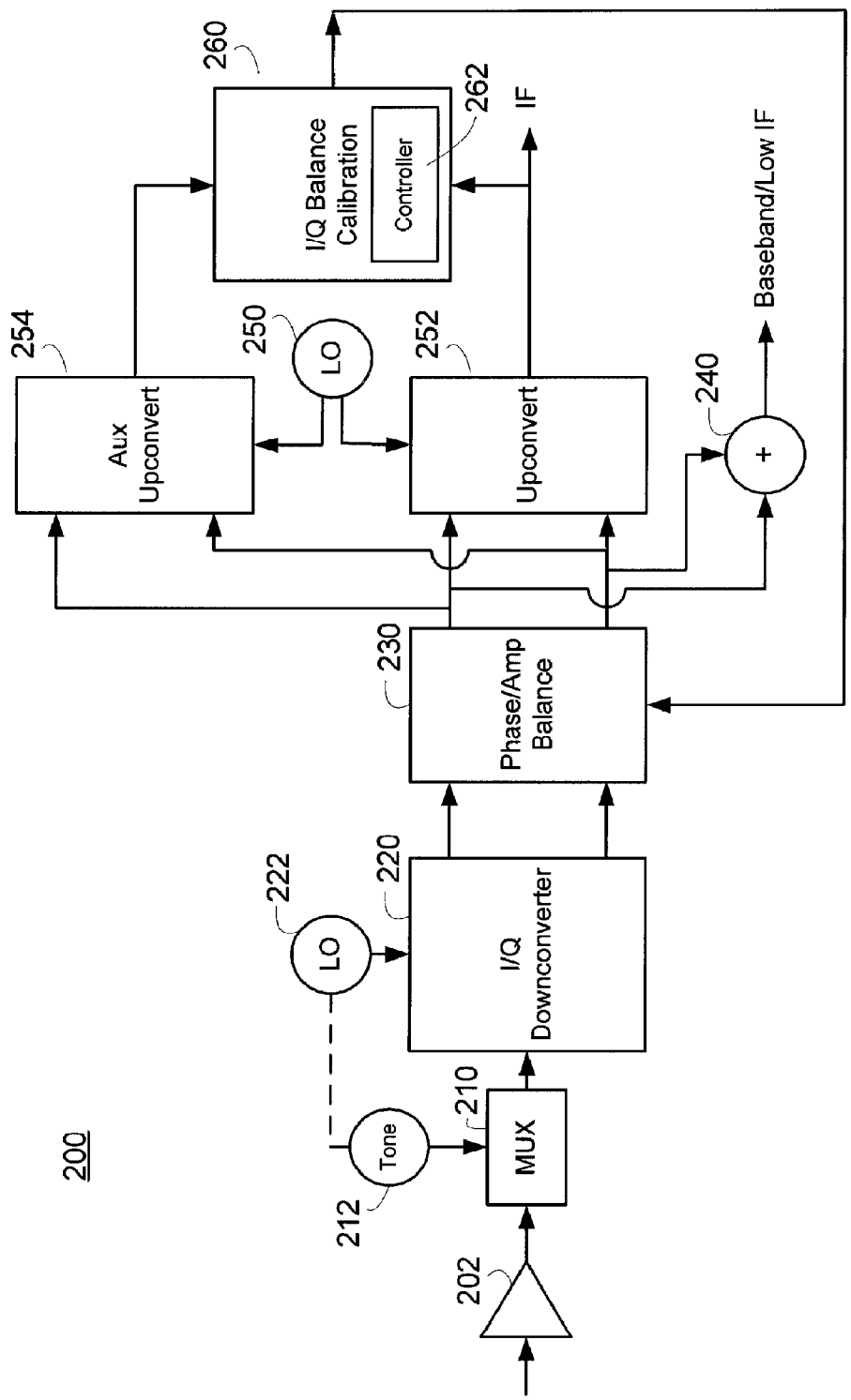
FIG. 2 is a simplified functional block diagram of an embodiment of a direct conversion receiver with IF upconversion implementing I/Q calibration.

FIG. 2 is a simplified functional block diagram of an embodiment of a direct conversion receiver 100 with IF upconversion implementing I/Q calibration. The receiver 100 can be implemented, for example, in the system of FIG. 1, and can be implemented in a single integrated circuit. The I/Q calibration can operate independent of external monitoring and input.

The receiver 100 of FIG. 2 includes an input coupled to the input of an amplifier 202 that can be configured to amplify the desired receive signal. In one embodiment, the amplifier 202 is a wideband amplifier that is configured to amplify signals across the entire one or more desired input frequency bands. The amplifier 202 can include one or more amplifier stages that can be configured in series, parallel or some combination of series and parallel connections. In another embodiment, the amplifier 202 can include a plurality of controllable amplifier stages, and each of the amplifier stages can be configured to support a portion of the entire desired input frequency bands. The amplifier stages can be selectively controlled base in part on a mode of the receiver 100 and a frequency of operation, which can be determined in part by the LO 222 frequency.

The output of the amplifier 202 is coupled to an first input of a multiplexer 210. A tone generator 212 is coupled to a second input of the multiplexer 210. The tone generator 212 can be configured as an independently controllable oscillator, or can be configured to generate a signal based in part on the frequency of the LO 222. For example, the output signal from the tone generator 212 may be at a fixed frequency offset relative to the LO 222 frequency. The tone generator 212 can use the frequency from the LO 222 to generate the tone output signal. In other embodiments, the tone generator 212 is independently controllable, and can be controlled to a desired output frequency.

The multiplexer 210 can be configured to selectively couple the amplified signal or the tone to a multiplexer output. A controller 262 controls the multiplexer 210 to select the amplifier output under typical operating conditions. The controller 262 controls the multiplexer 210 to select the tone generator output during portions of the I/Q calibration process. In another embodiment, the multiplexer 210 can also be configured to couple a null signal to the multiplexer output. Such a null signal can be coupled to the multiplexer output during portions of the I/Q calibration process.

Although the amplifier 202 and tone generator 212 are described as being coupled to a multiplexer 210, the multiplexer 210 functions to selectively couple one of a plurality of signals to an output. The multiplexer 210 can be or can include one or more switches, couplers, combiners, and the like that are configured to permit selective coupling of a signal from an input to an output. In a particular implementation, the multiplexer 210 can be implemented as a switch configured to selectively switch one of the amplifier output or the tone generator output to subsequent signal processing modules in the receiver 100.

The output of the multiplexer 210 is coupled to an I/Q downconverter 220. A local oscillator (LO) 222 provides a signal to the I/Q downconverter. The local oscillator 222 can be configured to generate LO signals in quadrature. Alternatively, the LO 222 can be configured to generate an LO signal of a single phase and the I/Q downconverter 220 can be configured to generate distinct I and Q LO signals, for example, using a phase shifter.

The LO 222 can be configured to tune to a frequency based on the frequency band of a desired signal from the multiplexer 210. For example, the LO 222 can be configured to tune across substantially an entire operating frequency band, where the receiver 100 is configured to support reception of each of a plurality of television signals spanning a wide band operating frequency range.

The I/Q downconverter 220 is configured to downconvert the signal at its input to a desired lower frequency band, which can be an IF, low-IF, or baseband. As used herein, the term Low-IF refers to frequencies that are less than one decade greater than a baseband signal bandwidth, and the term baseband refers to signals that are not modulated on a carrier frequency, and include near baseband signals that may be offset from true baseband signals by a fraction of the baseband bandwidth.

The I/Q downconverter 220 can use practically any form of frequency conversion, and can perform frequency conversion using, for example, mixers, multipliers, sampling, or some other means for frequency conversion.

In one embodiment, the I/Q downconverter 220 is configured to downconvert the input signals to baseband I and Q signals. The baseband I and Q signals are output from the I/Q downconverter 220 and are coupled to a phase and amplitude balancing module 230.

The phase and amplitude balance module 230 can operate to balance the phase and amplitude imbalances based on control signals from an I/Q balance calibration module 260. In one embodiment, the phase and amplitude balance module 230 can correct for phase and amplitude imbalance by independently controlling I and Q signals in a rectangular coordinate system. In another embodiment, the phase and amplitude balance module 230 can operate on phase and amplitude independently by operating on a polar form of the signal in a polar coordinate system.

The phase and amplitude balance module 230 can operate on an analog signal, a digital signal, or a combination of analog and digital signals. The input to the phase and amplitude balance module 230 can be analog or digital, and the phase and amplitude balance module 230 can be configured to output analog or digital signals.

The outputs of the phase and amplitude balance module 230 are coupled to an upconverter 252 and an auxiliary upconverter 254. It may be advantageous to ensure that signals to the inputs to the upconverter 252 and auxiliary upconverter 254 are not independently modified, or that the I and Q signals from the phase and amplitude balance module 230 coupled to the upconverter 252 and auxiliary upconverter 254 are processed in a similar manner.

Both the upconverter 252 and auxiliary upconverter 254 upconvert the I and Q signals using the same IF Local Oscillator (LO) 250 frequency. The I and Q signals are upconverted to an IF frequency of substantially $F_{if}$ in both the upconverter and auxiliary upconverter. However, the phase of the IF LO signal coupled to the auxiliary upconverter 254 can be controlled or otherwise selected to be in phase or in quadrature to the phase of the LO signal coupled to the upconverter 252. Additionally, the upconverter 252 operates to combine the upconverted I and Q signals in a manner that is complementary to the manner implemented by the auxiliary upconverter 254.

For example, the IF LO 250 can be configured to generate quadrature LO signals, and can coupled quadrature LO signals to both the upconverter 252 and the auxiliary upconverter 254. The quadrature LO signals coupled to the auxiliary upconverter 254 can be controlled or otherwise selected to be in phase or in quadrature with the quadrature LO signals coupled to the upconverter 252. The receiver 200 can be configured to determine the amplitude imbalance when the LO signals to the upconverter 252 and auxiliary upconverter 254 are in phase, and can be configured to determine the phase imbalance when the LO signals to the upconverter 252 and auxiliary upconverter 254 are in quadrature.

In one embodiment, the upconverter 252 operates to sum the upconverted I and Q signals (I+Q). The auxiliary upconverter 252, in this example, operates to output a complementary signal that is equal to the upconverted I signal minus the upconverted Q signal (I−Q). Similarly, if the upconverter 252 outputs the difference of the upconverted I and Q signals (I−Q), the auxiliary upconverter 254 outputs the sum (I+Q).

In general, the auxiliary upconverter 254 is configured to generate an IF signal having a sideband that is complementary to the sideband generated by the upconverter 252. The auxiliary upconverter 254 can be configured to invert one of the upconverted I or Q signals relative to the phase in the upconverter 252 prior to combining.

The outputs from the upconverter 252 and the auxiliary upconverter 254 are coupled to the I/Q balance calibration module 260. The I/Q balance calibration module 260 operates to mix together the signals output by the upconverter 252 and auxiliary upconverter 254 in order to determine amplitude offset and phase offset correction signals. The I/Q balance calibration module 260 couples the correction signals to the phase and amplitude balance module 230 to correct the I/Q imbalance, and thereby eliminate or substantially reduce the sideband signals.

The receiver 100 output can be the output of the upconverter 252, at a desired IF output frequency, or can be a baseband output that can be generated by combining the I and Q signals from the phase and amplitude balance module 230 using, for example, a signal summer 240.

The tone generator 212 and the I/Q balance calibration module 260 can be controlled to operate during a calibration process. For example, a controller 262 within the I/Q balance calibration module 260 can be configured to control the various modules during a calibration process. The controller 262 can, for example, include one or more processors that operate on one or more processor executable instructions stored in one or more storage devices. The one or more processors can retrieve and execute the one or more processor executable instructions to control the various modules within the receiver 100 to calibrate the I and Q signal paths.

The controller 262 can control the receiver 100 to execute the calibration process periodically, based on events, or based on some combination of time and event. Once the receiver 100 performs the calibration process, the corrections applied by the phase and amplitude correction module can be maintained, for example, until the next calibration process or until the receiver 100 powers down.

In one embodiment, the controller 262 can control the receiver 100 to execute the calibration process upon power up and upon each channel change operation, where the frequency of the LO 222 changes. Thus, the receiver 100 can be configured to perform I/Q calibration prior to processing a selected channel.

Figure 3:
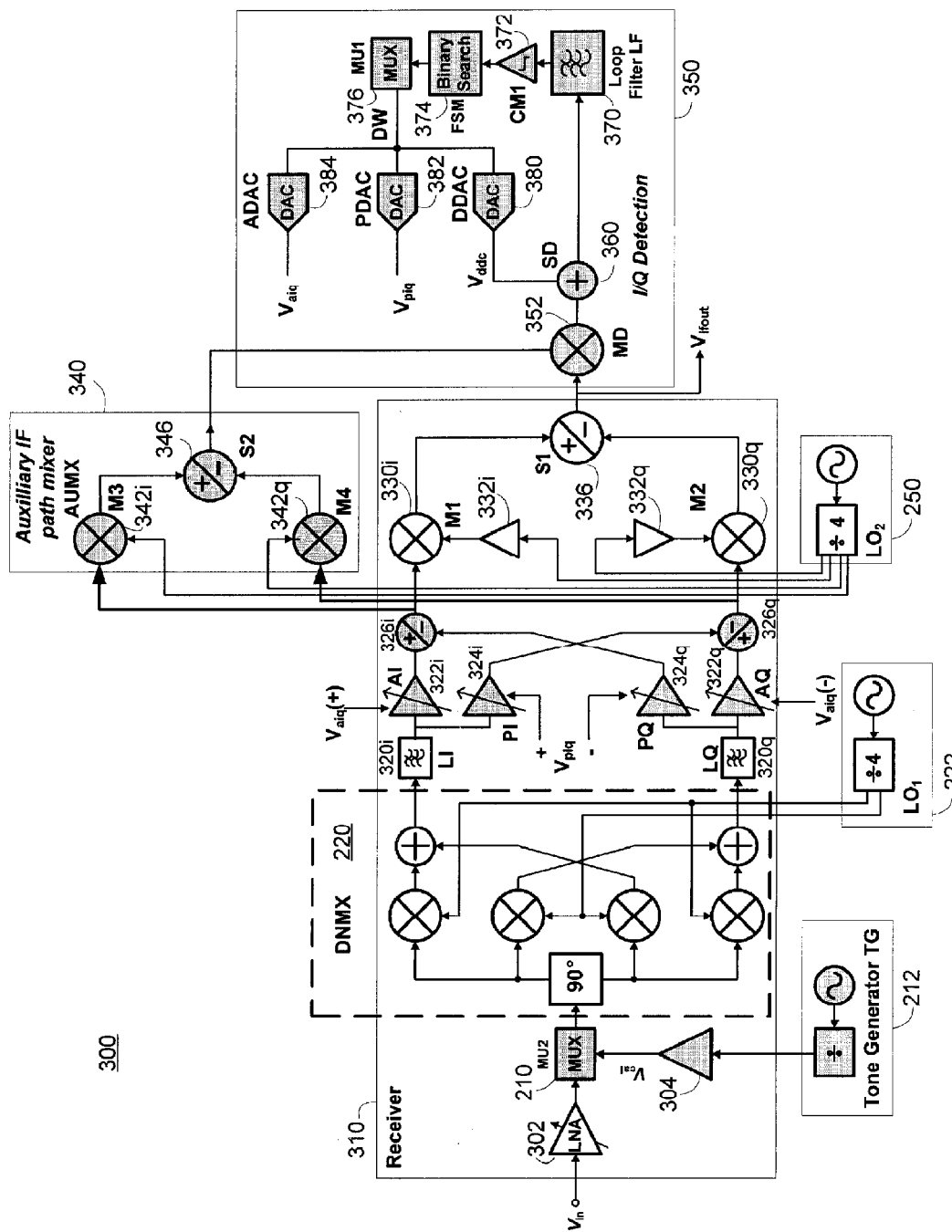
FIG. 3 is a simplified functional block diagram of an embodiment of a direct conversion receiver implementing I/Q calibration.

An embodiment of a direct conversion receiver 300 implementing I/Q calibration is illustrated in FIG. 3. The main components of the I/Q calibration include a signal receiver 310, a tone generator 212, an auxiliary mixer 340, and an I/Q detection module 350. The signal receiver 310 portion of the receiver 300 includes phase and amplitude balance amplifiers, 324i, 324q, 322i and 322q, and is configured to generate an output at an intermediate frequency (IF).

A received signal is coupled to the input of the signal receiver 310. The received signal may be, for example, a wideband signal spanning several octaves or decades and containing multiple distinct channels. An example of wideband signal with multiple distinct channels is a television signal, such as a cable television signal.

A LO 222 provides quadrature LO signals to the signal receiver 310 to downconvert a desired portion or channel from the received signal to, for example, baseband or near baseband. An IF LO 250 provides quadrature IF LO signals to the signal receiver to upconvert the downconverted I and Q signals to a desired IF. The signal receiver 310 combines the I and Q IF signals and outputs a composite IF signal.

The signal receiver 310 accepts the received signal at an input port, Vin, and couples the received signal to the input of an LNA 302. The output of the LNA 302 is coupled to an input of a multiplexer 210, which may be implemented as a switch.

A tone generator 212 is configured to generate a calibration tone during at least a portion of the calibration process. The tone generator 212 couples the tone output signal to a buffer amplifier 304 within the signal receiver 310. The output of the buffer amplifier 304 is coupled to a second input of the multiplexer 210.

The multiplexer 202 is configured to select the signal from the LNA 302 during normal operation, and is configured to deselect the signal from the tone generator 212 during at least a portion of the calibration process. The output from the multiplexer 210 is coupled to an input of a quadrature downconverter, here illustrated as a double quadrature mixer 220.

The double quadrature mixer 220 receives quadrature LO signals from the LO 222 to downconvert the desired signal to, for example, baseband. The frequency of the LO 222 can be tuned to downconvert the desired channel from the wide band input signal.

The I and Q signals output from the double quadrature mixer 220 are coupled to respective I and Q signal paths. Each of the I and Q signal paths includes a filter, 320$i$ or 320$q$ configured to filter out noise and interference that lies outside of a desired signal bandwidth. Each of the I and Q signal paths also includes amplifiers, e.g. 322$i$, 322$q$, 324$i$, and 324$q$, and phase rotators, 326$i$ or 326$q$, that are configured to balance the amplitude and phase of the I and Q signal paths.

The balanced I and Q signals are coupled to a quadrature upconverter that is part of the signal receiver 310. The balanced I and Q signals are also coupled to an auxiliary mixer (AUMX) 340 that operates to generate a LO signal for use in performing the I/Q balance.

The IF LO 250 generates quadrature IF LO signals and couples the quadrature IF LO signals to the upconverter and AUMX 340. The IF LO 250 can be configured to generate the same LO signals for both the upconverter and AUMX 340. The IF LO can be configured to generate LO signals having any of a predetermined number of phase offsets. In some instances, the IF LO can generate LO signals for the AUMX that are phase offset, for example in quadrature, to the LO signals coupled to the upconverter. Within the signal receiver, the I and Q IF LO signals are coupled to respective I and Q buffer amplifiers 332$i$ and 332$q$. The outputs from the I and Q buffer amplifiers 332$i$ and 332$q$ drive the respective I and Q upconverting mixers 330$i$ and 330$q$ that operate to upconvert the balanced I and Q signals to IF. The upconverted I and Q signals are combined using a signal combiner 336.

The quadrature IF LO signals are also coupled to LO inputs of I and Q auxiliary mixers 342$i$ and 342$q$, respectively, in the AUMX 340. As described above, the quadrature LO signals coupled to the AUMX 340 can be selectively controlled to be in phase or in quadrature with the quadrature LO signals coupled to the upconverter. The upconverted I and Q signals in the AUMX 340 are combined using a combiner S2 346 that is configured to produce an IF signal having a sideband or image that is complementary to the sideband or image produced at the IF output of the signal receiver 310. The combined signal from combiner S2 346 may be in phase or in quadrature with the signal output from the upconverter (output from S136), depending on the phase relationship between the phases of the LO signals to the upconverter and AUMX 340.

Calibration can be performed after the receiver 300 has switched to the desired channel and can be performed in a short time interval just prior to receiving the desired signal.

During calibration, tone generator 212 produces a tone near the desired RF channel. The tone output from the tone generator 212 may be at the center of the frequency band of the desired RF channel or may be offset from a channel center frequency by an amount that can be selected to accommodate a particular standard. The frequency offset can be designated as $F_{os}$. For example, in NTSC the offset, $F_{os}$, can be chosen to be equal to the frequency offset of the video carrier. The tone is injected into multiplexer MU2 210. A controller, which can be a distinct controller (not shown) or a portion of the I/Q detection module controls the multiplexer 210 during calibration to select the tone from the tone generator 212 and deselect the desired input signal Vin that is amplified by the amplifier 302.

The tone is downconverted by the mixer DNMX 220 (which in this illustration is shown as a double-quadrature mixer) to produce downconverted I and Q signal components. The I and Q signal components of the downconverted tone are coupled to respective channel selection filters LI 320$i$ and LQ 320$q$.

The outputs of the channel selection filters 320$i$ and 320$q$ are coupled to respective phase and amplitude balance amplifiers, 324$i$, 324$q$, 322$i$ and 322$q$. The output from the in-phase amplitude balance amplifier 322$i$ is coupled to a first input of a first phase rotator 326$i$. The output from the in-phase phase balance amplifier 324$i$ is coupled to a second input of a second phase rotator 326$q$. Similarly, the output from the quadrature amplitude balance amplifier 322$q$ is coupled to a first input of the second phase rotator 326$q$. The output from the quadrature phase balance amplifier 324$q$ is coupled to a second input of the first phase rotator 326$i$.

The phase rotators 326$i$ and 326$q$ operate to rotate the phase of the I and Q signal components. In the embodiment of FIG. 3, the phase rotators 326$i$ and 326$q$ are configured as signal summers or subtractors. The first phase rotator 326$i$ can rotate the I signal component by summing a quadrature signal to the in-phase signal component. The magnitude of the quadrature signal relative to the magnitude of the I signal component determines the phase rotation. The phase of the quadrature signal, i.e. whether the quadrature signal is added or subtracted from the I signal component, can determine the direction of the phase rotation. Similarly, the second phase rotator 326$q$ operates to rotate the phase of the Q signal component by adding or subtracting an in-phase signal to the quadrature signal component.

Typically, the phase rotation needed for calibration is small, and less than one quadrant in either direction. Of course, the phase rotators 326$i$ and 326$q$ need not be limited to a phase rotation of +/−90 degrees, and may be configured to introduce any phase rotation.

Additionally, the phase rotators 326$i$ and 326$q$ illustrated in FIG. 3 provide phase rotation in a rectangular coordinate system. In other implementations, the phase rotators 326$i$ and 326$q$ may be configured to introduce a phase rotation in a polar coordinate system. In such an implementation, the phase rotators 326i and 326q may be configured to introduce a phase rotation without affecting a magnitude of the signal component that is being rotated.

The outputs from the first and second phase rotators 326i and 326q represent the balanced I and Q signal components, respectively. Each of the balanced I and Q signal components is coupled to respective upconverters. The balanced I and Q signal components are upconverted through the auxiliary path mixer AUMX 340 and the signal path mixers M1 330i and M2 330q. For simplicity the mixers in the auxiliary path mixer 340 and the signal path mixers 330i and 330q are shown as single quadrature mixers in FIG. 3 but can also be implemented as double quadrature mixers or some other type of frequency conversion device or module.

The output of AUMX 340 is selected (through the polarity of the combiner S2 346) to be either lower-sideband or upper-sideband, while the output Vifout is selected (through the polarity of combiner S1 336) to be upper-sideband or lower-sideband, respectively (i.e. the opposite sideband as the output of AUMX 340). That is, the AUMX 340 output is controlled to select the opposite or otherwise complementary sideband or image that is output at the IF output, Vifout.

The sideband signals are coupled to inputs of a mixer 352 in the I/Q detection module 350. The sideband signals are mixed in mixer MD 352 and the output is filtered through loop filter LF 370 (this can be implemented using any suitable transfer function). The output polarity of the filtered signal is compared using comparator CM1 372 which feeds a finite state machine FSM 374 which generates a digital search word DW. Any imbalance in the phase or gain of the I and Q paths results in an output from MD 352 which is nonzero and greater than or less than a predetermined threshold, such as zero, discussed in more detail below.

The calibration process can be described as operating in three stages. In an initial stage, the calibration process can calibrate, compensate, or otherwise correct for imbalances attributable to the mixers and I/Q detection module 350. In a second stage, one of the phase or amplitude imbalance is calibrated. For example, the second stage can calibrate the phase imbalance. In the third stage, the amplitude imbalance is calibrated.

In other embodiments, the imbalance attributable to the various calibration modules, including the mixers and I/Q detection module 350, can be minimal. In such an embodiment, the first stage can be omitted. In other embodiments, the order of the phase and amplitude calibration may be reversed. In yet other embodiments, for example where the phase rotator operates in a polar coordinate system, the phase and amplitude calibration may be performed concurrently or simultaneously.

Initial DC Calibration.

During the initial DC calibration stage, the DC offset attributable to the I/Q detection module 350 is removed using a DC offset generated by a calibration Digital to Analog Converter DDAC 380 and adder SD 360, driven by FSM 374. During the first stage, the multiplexer 376 within the I/Q detection module 350 is controlled to direct the signal from the FSM 374 to the DDAC 380. The FSM 374 adjusts the output from the DDAC 380 until the output of the LF 370 is minimized or otherwise beneath a predetermined threshold.

The FSM 374 can be configured to perform a binary search. For example, the FSM 374 can include a look-up table or database that relates a digital word, DW, to a voltage offset provided by the DDAC 380. Alternatively, the FSM 374 can include a nominal DW value corresponding to a predetermined offset voltage step size. The look-up table need not relate DW to actual voltage values, but instead may relate the DW to the full scale output of the DDAC 380.

The FSM 374 can perform the binary search by examining the signal from the comparator CM1 372. The FSM 374 can output an initial DW based on the polarity of the signal from the comparator CM1 372. The DDAC 380 outputs a DC offset value based on the initial DW. The adder SD 360 sums the compensation DC offset value from DDAC 380 with the signal output by the mixer 352. The LF 370 filters the signal and presents the updated DC offset value to the comparator CM1 372.

The FSM 374 examines at least the polarity of the signal output from the comparator to determine if the DC offset value from DDAC 380 is to be further increased or decreased. The FSM 374 performs the binary search by adjusting the DW to increment or decrement the DC offset from the DDAC 380 by approximately half of the step size used in the prior iteration. The binary search continues until the FSM converges on the solution. The number of iterations needed to converge on a solution in a binary search is approximately equal to the number of bits in the DW. For example, if the DW to the DDAC 380 is 8-bits, the FSM 374 can converge to a solution in approximately 8 iterations. The duration of each iteration can be configured to depend upon the bandwidth of the loop filter 370.

During this initial DC calibration, the tone generator 212 and the LNA 302 are disabled, or otherwise de-selected, in order to prevent signals from these elements from affecting the detector output during initial calibration. For example, the multiplexer 210 in the receiver 310 can be configured to select a null input that is connected to neither the LNA nor the tone generator 212. As an example, the null input to the multiplexer 210 can be a signal ground. Alternatively, the receiver 300 can disable one or both of the LNA 302 and tone generator 212 and can select either input from the multiplexer 210.

The DC calibration of the I/Q detection module 350 can be performed on the same schedule as or on a different schedule than the calibration of the I and Q imbalance. That is, the DC calibration may be more insensitive to changes in channel selection or time, and thus, the DC calibration may be performed less frequently than the I/Q imbalance calibration. For example, the DC calibration may occur upon power up, but may not update at each channel change event.

Phase Calibration.

During the phase calibration stage, the phase imbalance of the I and Q paths is calibrated out using PDAC 382 and the phase trimming amplifiers PI 324i and PQ 324q.

The I/Q detection module 350 is controlled to couple the output of the FSM 374 to PDAC 384. For example, during phase calibration, the multiplexer routes the output of the FSM 374 to PDAC 382. In one embodiment, the PDAC 384 output is configured to control the gains of PI 324i and PQ 324q in opposite directions (as indicated by the + and − signs). As the gain of PI 324i increases, the gain of PQ 324q decreases and vice versa. In another embodiment, the PDAC 384 output is configured to control the gains of PI 324i and PQ 324q equally, and the direction of the phase rotation is determined by the polarity of the inputs of the respective phase rotators 326i and 326q. In the latter embodiment, the PDAC 382 can be configured to control the gains of the PI 324i and PQ 324q to minimal values under ideal conditions, and can increase the gain of the amplifiers to increase a phase rotation of one signal path relative to the other.

The output from the tone generator 212 is selected via the multiplexer 210. The LO signals from the IF LO 250 for the AUMX 340 are controlled to be in quadrature with the LO signals coupled to the upconverter. As a result, AUMX 340 is configured to provide an LO signal equal to, for example, cos $[2*pi*(F_{if}-F_{os})t]$. The output from AUMX 340 is in quadrature with the IF output from the signal receiver 302.

The voltage output from the LF 370 is $V=-V_{cal}\cdot\sin(\theta/2)/8$, where theta represents the phase imbalance between I and Q channels and Vcal is based on the amplitude of the tone generator 212 signal. As such, the voltage output from LF 370 retains sign information of the mismatch, which is extracted by comparator CM 372 and used to control the FSM 374. The FSM 374 can be configured to perform a binary search in order to converge to a solution for the PI 324*i* and PQ 324*q* gain control values. The binary search can be performed using a binary search that is similar to the binary search described above in relation to the initial DC offset calibration.

At the end of this calibration stage, the phase imbalance of the system has been minimized or otherwise reduced to a value below a predetermined threshold. The phase calibration control signal output by the PDAC 382 can be maintained until the next calibration event, where the control signal value can be updated.

Amplitude Calibration.

During the amplitude calibration stage, the amplitude imbalance of the I and Q paths is calibrated out using ADAC 384 and the amplitude trimming amplifiers AI 322*i* and AQ 322*q*.

The ADAC 384 controls AI 322*i* and AQ 322*q* in opposite directions (as indicated by the + and − signs) so that as the gain of AI 322*i* increases, the gain of AQ 322*q* decreases and vice versa.

The output from the tone generator 212 is selected via the multiplexer 210. The LO signals from the IF LO 250 for the AUMX 340 are controlled to be in phase with the LO signals coupled to the upconverter. As a result, AUMX 340 is configured to provide an LO signal equal to, for example, sin $[2*pi*(F_{if}-F_{os})t]$. The output from AUMX 340 is in phase with the IF output from the signal receiver 302.

The voltage coming out of LF 370 is $V=\delta\cdot V_{cal}\cdot\cos(\theta/2)/4$, where theta represents the phase imbalance between I and Q channels and delta represents the amplitude mismatch between I and Q channels. As such, the voltage from the LF 370 retains sign information of the amplitude mismatches, which is extracted by comparator CM 372 and used to control the FSM 374.

The FSM 374 can be configured to perform a binary search in order to converge to a solution for the AI 322*i* and AQ 322*q* gain control values. The binary search can be performed using a binary search that is similar to the binary search described above in relation to the initial DC offset calibration.

At the end of this calibration stage, the amplitude imbalance of the I and Q paths has been minimized or otherwise reduced to within a predetermined range. The amplitude calibration control signal output by the ADAC 384 can be maintained until the next calibration event, where the control signal value can be updated.

Figure 4:
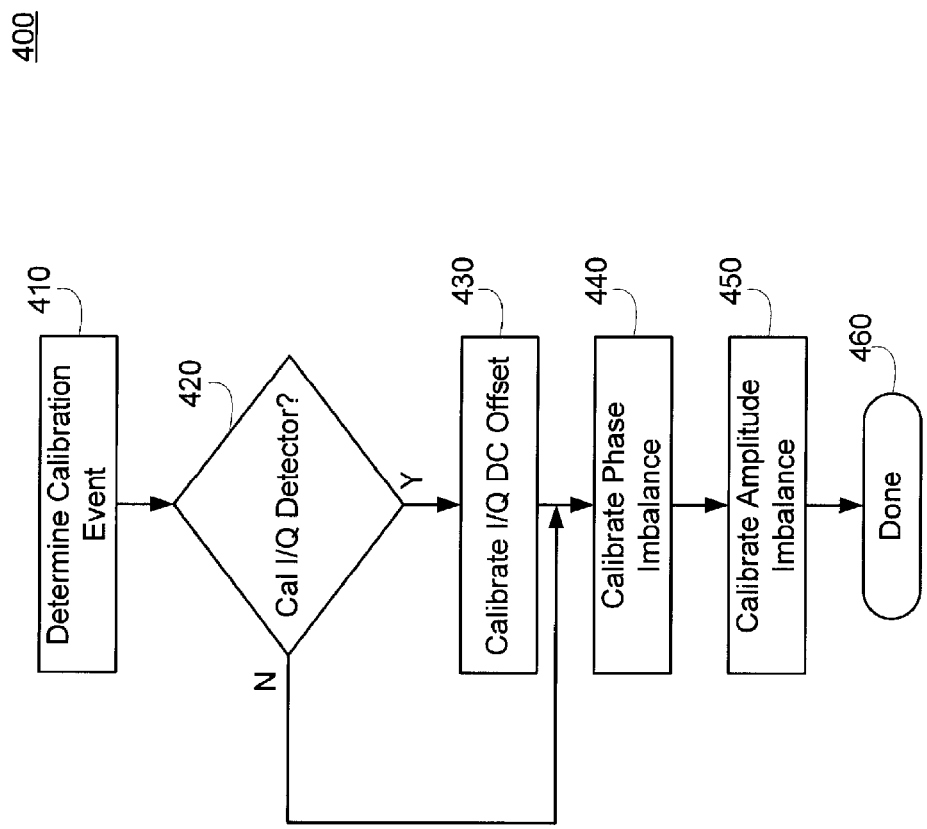
FIG. 4 is a simplified flowchart of an embodiment of a method of I/Q calibration.

FIG. 4 is a simplified flowchart of an embodiment of a method 400 of I/Q calibration. The method 400 can be implemented, for example, in the receivers of FIG. 2 or FIG. 3 to provide a receiver having improved sideband rejection in the system of FIG. 1. The method 400 of FIG. 4 permits automated I/Q calibration without the need for external test equipment or external intervention. This permits the receiver to be calibrated for near optimal operation at each channel across a wide band operating range.

The method 400 begins at block 410 where the receiver determines the occurrence of a calibration event. The receiver can be configured to calibrate the I/Q imbalance at the occurrence of each of a number of predetermined events. The events may be time based or independent of the passage of time. For example, the receiver may perform I/Q calibration as part of a power up routine, and the receiver may perform I/Q calibration after each channel change operation or after channel change operations that span greater than some predetermined number of channels.

After determining the occurrence of the calibration event, the receiver proceeds to decision block 420 to determine if an initial calibration of the I/Q detection module is to be performed. The error attributable to the I/Q calibration module should not contribute to the calibration process, and thus should be calibrated, compensated, or otherwise eliminated. However, errors attributable to the I/Q detection module, such as DC offset, may be relatively time and channel invariant. As such, the receiver may not need to perform calibration of the I/Q detection module each time a calibration event is detected. Therefore, in one embodiment, the receiver can determine what type of calibration event occurred, and determine if the calibration event is one of a subset of calibration events that warrants calibration of the I/Q detection module.

If not, the receiver bypasses block 430 and proceeds directly to block 440. If the receiver determines at decision block 3420 that calibration of the I/Q detection module is desirable, the receiver proceeds to block 430 and performs calibration of the I/Q detection module, for example, by calibrating the DC offset attributable to the module. The receiver proceeds to block 440.

At block 440, the receiver performs phase imbalance calibration. In a quadrature receiver, the receiver calibrates the I and Q signal paths to maintain a phase difference of approximately 90 degrees between the two. Establishing the phase difference close to 90 degrees reduces the interference effects attributable to sidebands.

The receiver proceeds to block 450 and calibrates the amplitude balance between I and Q signal paths. Balancing the amplitudes of the I and Q signal paths reduces the level of the sideband. The order of phase and amplitude calibration need not occur in the order shown, and need not occur serially. However, in the embodiment illustrated in FIG. 3, it may be convenient to calibrate phase imbalance prior to calibrating the amplitude imbalance, because the phase rotators illustrated in FIG. 3 do not necessarily maintain a consistent magnitude when rotating the phase of the signal.

After calibrating the initial DC offset, phase imbalance, and amplitude imbalance, the I/Q calibration is complete. The receiver may operate on the received signal until the occurrence of the next calibration event.

Figures 5, 6:
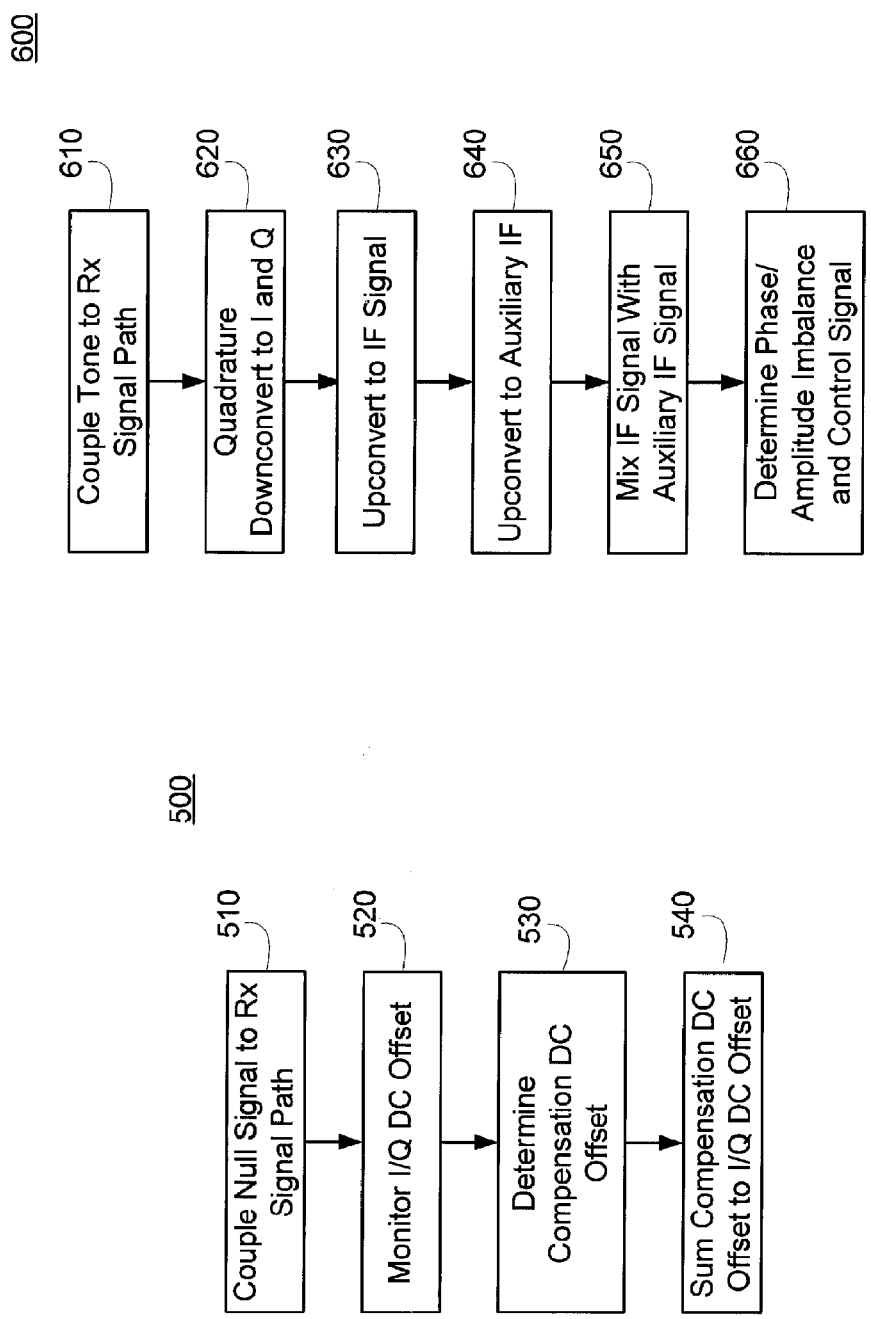
FIG. 5 is a simplified flowchart of an embodiment of a method initial DC offset calibration.
FIG. 6 is a simplified flowchart of an embodiment of a method of phase/amplitude imbalance calibration.

FIG. 5 is a simplified flowchart of an embodiment of a method 500 of initial DC offset calibration. The method 500 can be used as part of calibration method of FIG. 4 to calibrate the initial DC offset in the I/Q detection module.

The method 500 begins at block 510 where the receiver, in the calibration state, couples a null input to a receive signal path. For example, the receiver can control a multiplexer at a receiver front end to couple a null signal to the front end signal path and deselect any other signal sources from the receiver.

The receiver proceeds to block 520 and monitors a DC offset in the I/Q detection module. The DC offset is monitored using the same elements that are used to monitor the phase or amplitude imbalance. For example, a comparator can compare the DC offset against a predetermined threshold, such as 0 volts, and output one of two possible signals to a finite state machine (FSM) configured to perform a binary search.

The receiver proceeds to block 530 and determines a DC compensation value. The FSM can, for example, initiate and perform a binary search, where an initial compensation digital word is coupled to a DAC for conversion into a DC compensation value. The DC compensation value is summed to the DC offset, and the adjusted DC offset is again compared by the comparator.

The change, or lack thereof, in the output from the comparator is sensed in the FSM on the next iteration of the binary search. The FSM can revise the digital word by an amount that results in a change in the DAC output by substantially half of the voltage step used in the previous iteration, either upward or downward. The FSM can continue to monitor the comparator output for subsequent iterations until the smallest increment of change is applied to the digital word. The digital word, and the corresponding DC compensation value, then represent the DC calibration value.

The receiver proceeds to block 540 and sums the DC compensation value to the I/Q detection module DC offset until the DC offset is next calibrated.

FIG. 6 is a simplified flowchart of an embodiment of a method 600 of phase/amplitude imbalance calibration. The method 600 can be performed as part of the method of FIG. 4, within a receiver, such as a receiver of FIG. 2 or FIG. 3.

The method 600 begins at block 610, where the receiver, during a calibration state, couples a tone generator output to a signal path of the receiver. The tone generator output may be coupled to an RF frontend signal path and may be accompanied by decoupling any received signal to the receiver signal paths. The tone generator frequency can be programmable and can be set to, for example, the center frequency of a desired channel or offset from a center frequency of a desired channel. For example, an NTSC channel has a video signal that is offset from the center of the channel bandwidth. The tone generator may be offset from the center of a desired channel by a similar amount.

The receiver proceeds to block 620 and downconverts the tone to downconverted I and Q signals. The receiver operates on the signal processing performed on the downconverted I and Q signals to balance the I and Q signal paths in the receiver.

The receiver proceeds to block 630 and upconverts the downconverted I and Q signals, and preferably the downconverted I and Q signals following any stages used in the I/Q imbalance calibration. The receiver produces IF I and Q signals, for example, by mixing the I and Q signals with an IF LO. The receiver sums the IF I and Q signal to produce an IF signal having a sideband that is attributable to the I/Q imbalance.

The receiver proceeds to block 640 and concurrently upconverts the I and Q signals following the imbalance calibration stages to auxiliary IF I and Q signals. The receiver utilizes the same IF LO used to produce the IF signal. The receiver sums the auxiliary IF I and Q signals to produce an auxiliary IF signal. However, the receiver selectively controls the polarity of the signal summer to produce an auxiliary IF having a complementary sideband to the sideband associated with the IF signal.

As an example, the receiver can sum the IF I and Q signals to produce an IF signal having a lower sideband. The receiver controls the polarity of the summer in the auxiliary upconverter to produce the auxiliary IF signal with an upper sideband.

The receiver generates an LO signal based on the auxiliary IF that can be a cos(2*pi*IF) or a sin(2*pi*IF), depending on whether amplitude or phase imbalance is being calibrated.

The receiver proceeds to block 650 and mixes the IF signal with the auxiliary IF signal to produce a DC value whose amplitude varies based on the imbalance in phase or amplitude. The receiver proceeds to block 660 and determines the phase or amplitude imbalance and the control signal needed to apply to phase or amplitude imbalance amplifiers in order to compensate for the imbalance. The receiver can use a distinct DAC for each of the phase and amplitude imbalance controls, and can maintain the value of the control until the next I/Q calibration process.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of calibrating a receiver, the method comprising:
    coupling a tone to a receive signal path;
    frequency converting the tone to in-phase (I) and quadrature (Q) signals;
    frequency converting the I and Q signals to an intermediate frequency (IF) signal having a sideband attributable to an I/Q imbalance;
    frequency converting the I and Q signals to an auxiliary IF signal having a sideband that is complementary to the sideband of the IF signal;
    mixing the IF signal with the auxiliary IF signal to produce a baseband signal; and
    adjusting at least one of an amplitude or a phase of at least one of the I and Q signals based on the baseband signal.

2. The method of claim 1, wherein coupling the tone to the receive signal path comprises:
    generating the tone at a desired frequency; and
    controlling a multiplexer to select the tone.

3. The method of claim 1, wherein coupling the tone to the receive signal path comprises coupling a tone at a frequency offset from a center frequency of a desired channel by a predetermined frequency offset.

4. The method of claim 1, wherein frequency converting the tone to I and Q signals comprises:
    mixing the tone with a Local Oscillator (LO) signal to produce an in-phase baseband signal; and
    mixing the tone with a quadrature LO signal to produce a quadrature baseband signal.

5. The method of claim 1, wherein frequency converting the I and Q signals to the IF signal comprises:
    mixing the I signal with an IF LO to generate an IF in-phase (I) signal;
    mixing the Q signal with the IF LO to generate an IF quadrature (Q) signal; and
    summing the IF I signal with the IF Q signal.

6. The method of claim 1, wherein frequency converting the I and Q signals to the auxiliary IF signal comprises:
    mixing the I signal with an IF LO to generate an auxiliary IF in-phase (I) signal;
    mixing the Q signal with the IF LO to generate an auxiliary IF quadrature (Q) signal;
    inverting the auxiliary IF I signal relative to an IF I signal to generate a complementary IF I signal; and
    summing the complementary IF I signal with the auxiliary IF Q signal.

7. The method of claim 1, wherein frequency converting the I and Q signals to the auxiliary IF signal comprises:
    mixing the I signal with an IF LO to generate an auxiliary IF in-phase (I) signal;
    mixing the Q signal with the IF LO to generate an auxiliary IF quadrature (Q) signal;
    inverting the auxiliary IF Q signal relative to an IF Q signal to generate a complementary IF Q signal; and summing the auxiliary IF I signal with the complementary IF Q signal.

8. The method of claim 1, wherein mixing the IF signal with the auxiliary IF signal comprises mixing the IF signal with an auxiliary IF signal that is in phase with the IF signal.

9. The method of claim 1, wherein mixing the IF signal with the auxiliary IF signal comprises mixing the IF signal with an auxiliary IF signal that is in quadrature with the IF signal.

10. The method of claim 1, wherein adjusting at least one of the amplitude or the phase of at least one of the I and Q signals based on the baseband signal comprises:
    comparing the baseband signal with a predetermined threshold to produce a comparison output; and
    adjusting a phase of at least one of the I and Q signals based on a polarity of the comparison output.

11. The method of claim 1, wherein adjusting at least one of the amplitude or the phase of at least one of the I and Q signals based on the baseband signal comprises:
    comparing the baseband signal with a predetermined threshold to produce a comparison output; and
    adjusting a gain of at least one of the I and Q signals based on a polarity of the comparison output.

12. The method of claim 1, wherein adjusting at least one of the amplitude or the phase of at least one of the I and Q signals based on the baseband signal comprises adjusting a phase of the I signal by summing a quadrature signal component generated from the Q signal, wherein an amplitude of the quadrature signal component is based on the baseband signal.

13. The method of claim 1, wherein adjusting at least one of the amplitude or the phase of at least one of the I and Q signals based on the baseband signal comprises performing a binary search of a compensation control value based on the baseband signal.

14. The method of claim 1, wherein adjusting at least one of the amplitude or the phase of at least one of the I and Q signals based on the baseband signal comprises:
    adjusting a value output from a first Digital to Analog Converter (DAC) that controls a phase of at least one of the I signal or the Q signal; and
    adjusting a value output from a second DAC that controls an amplitude balance between the I signal and the Q signal.

15. A method of calibrating a receiver; the method comprising:
    determining a calibration event based on a channel selection from one of a plurality of channels in a received wide band signal;
    deselecting the received wideband signal from a receive signal path;
    coupling a tone to the receive signal path;
    frequency converting the tone to a baseband in-phase (I) signal and a baseband quadrature (Q) signal;
    frequency converting the I signal and the Q signal using an intermediate frequency (IF) local oscillator (LO) signal to an IF signal having a sideband attributable to an I/Q imbalance;
    frequency converting the I and Q signals using the IF LO signal to an auxiliary IF signal, wherein a phase of the auxiliary IF signal relative to the IF signal is controlled to one of a plurality of predetermined phases;
    mixing the IF signal with the auxiliary IF signal to produce a baseband signal; and
    adjusting for at least one of a phase or amplitude imbalance in the I signal and the Q signal based on the baseband signal.

16. An apparatus for calibrating a receiver, the apparatus comprising:
    a tone generator;
    a multiplexer having a first input coupled to a receive signal path and a second input coupled to the tone generator, and controlled to select one of the receive signal path or the tone generator;
    an in-phase (I)/quadrature (Q) downconverter coupled to the multiplexer and configured to downconvert a signal output from the multiplexer to an I signal and a Q signal;
    a balance module coupled to the I/Q downconverter and configured to adjust a phase of the I signal relative to the Q signal based on a phase control signal;
    an intermediate frequency (IF) local oscillator (LO);
    an upconverter coupled to the balance module and the IF LO and configured to upconvert the I signal and the Q signal to an IF signal;
    an auxiliary upconverter coupled to the balance module and the IF LO and configured to upconvert the I signal and the Q signal to an auxiliary IF signal having a phase relative to the phase of the IF signal selected from a plurality of predetermined phases; and
    an I/Q calibration module configured to mix the IF signal with the auxiliary IF signal to generate a baseband signal, and further configured to determine a value of the phase control signal based at least in part on the baseband signal.

17. The apparatus of claim 16, wherein the multiplexer is configured to select the tone generator during at least a portion of a calibration process.

18. The apparatus of claim 16, wherein the balance module is further configured to adjust an amplitude of at least one of the I signal or the Q signal based on an amplitude control signal, and the I/Q calibration module determines the amplitude control signal based at least in part on the baseband signal.

19. The apparatus of claim 18, wherein the I/Q calibration module is configured to determine the amplitude control signal when the IF signal is in phase with the auxiliary IF signal.

20. The apparatus of claim 18, wherein the I/Q calibration module is configured to determine the phase control signal when the IF signal is in quadrature with the auxiliary IF signal.

21. An apparatus for calibrating a receiver, the apparatus comprising:
    means for generating a tone;
    means for selecting one of an output from the means for generating the tone or a signal;
    means for converting an output signal from the means for selecting to an in-phase (I) signal and a quadrature (Q) signal;
    means for adjusting an amplitude and a phase of the I signal and the Q signal;
    means for upconverting the I signal and the Q signal to an intermediate frequency (IF) signal;
    means for upconverting the I signal and the Q signal to an auxiliary IF signal having a sideband that is complementary to a sideband of the IF signal;
    means for mixing the IF signal with the auxiliary IF signal to produce a baseband signal; and
    means for determining a control signal based on the baseband signal, wherein the control signal is coupled to the means for adjusting and controls the means for adjusting.

* * * * *